Aug. 9, 1938.      R. H. P. COLLINGS      2,125,992

VOLTAGE MEASURING AND INDICATING DEVICE

Filed May 11, 1934

INVENTOR
RUPERT HEDLEY PALK COLLINGS
BY
ATTORNEY

Patented Aug. 9, 1938

2,125,992

UNITED STATES PATENT OFFICE 2,125,992

VOLTAGE MEASURING AND INDICATING DEVICE

Rupert Hedley Palk Collings, Liskeard, Cornwall, England, assignor to Radio Corporation of America, a corporation of Delaware Application May 11, 1934, Serial No. 725,221
In Great Britain May 26, 1933

2 Claims. (Cl. 179—171)

This invention relates to voltage measuring and indicating devices and more specifically to devices for accurately measuring or indicating peak voltages.

The principal application of this invention is to the measurement or indication of the percentage of modulation in radio telephone and like modulated carrier wave transmitters, and arrangements in accordance with this invention may be used in connection with all general known forms of radio transmitters including so-called suppressed carrier transmitters and so-called single side band transmitters.

The only really reliable and accurate methods so far known for the measurement of the percentage of modulation in radio telephone and like transmitters involves the use of cathode ray oscillographs and these devices are somewhat expensive. In consequence it is customary to employ other methods involving the use of some kind of thermionic voltmeter and galvanometer which, though not so reliable, do not involve the use of such expensive apparatus, but in practice more or less serious inaccuracies are apt to arise by reason chiefly of defects in the galvanometer. If the damping of the galvanometer is too high the instrument tends to become inoperative for impulses of very short time duration, while, on the other hand, if the damping is very light the deflection will not depend only upon the intensity of the actuating pulse but also on its character, e. g., its time duration.

The present invention provides a simple voltage measuring or indicating device which is relatively cheap to construct and arrange, is sufficiently accurate in its results and avoids the aforementioned difficulties.

According to this invention the peak voltage to be measured or indicated is applied to the control electrodes of a thermionic valve so as to alter the internal impedance thereof in dependence upon the applied peak voltage, and voltage set up in the anode circuit of this thermionic valve is utilized to control a gas filled relay of the electron discharge type between whose anode and cathode is applied a suitable auxiliary voltage, the arrangement being such that when the control voltage applied to the said relay reaches a certain amount it "flashes" and the occurrence of this flashing gives an indication of conditions from a knowledge of which the applied peak voltage may be calculated.

Figure 1:
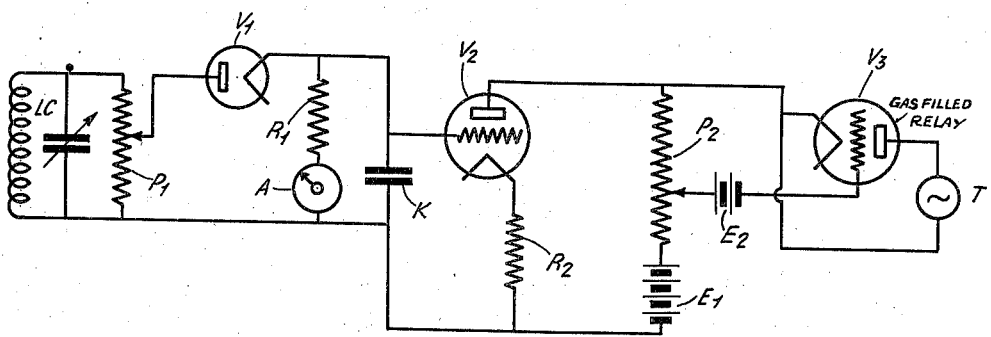
Figure 2:
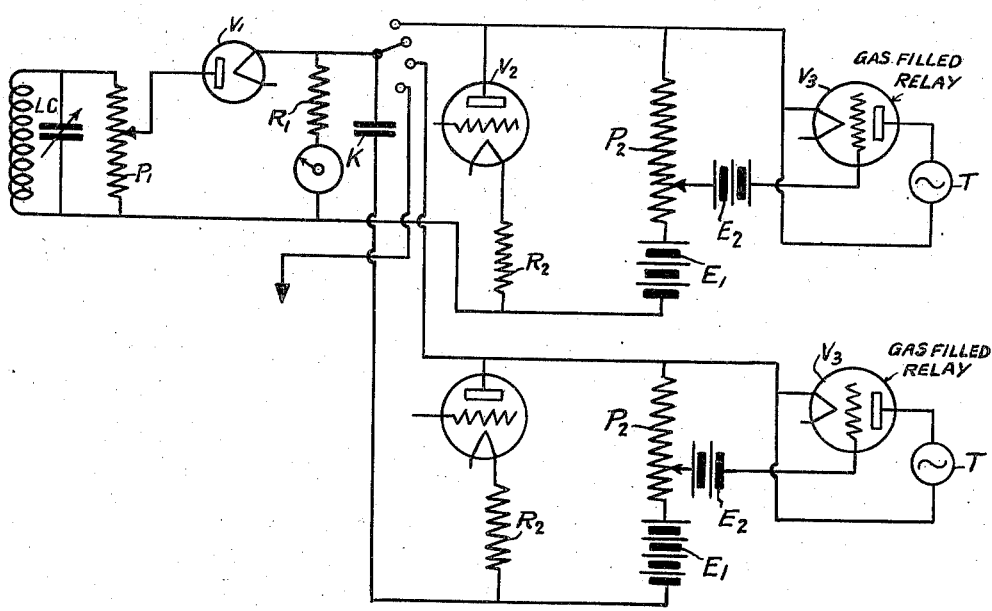

The invention is illustrated in the accompanying drawing in which Fig. 1 shows diagrammatically a circuit arrangement of a simple modulation indicator in accordance with this invention. Fig. 2 shows diagrammatically a circuit arrangement of a multiple modulation indicator of this invention.

Referring to Fig. 1 of the drawing, the modulation meter arrangement therein shown comprises a tuned pick-up circuit LC consisting of an inductance in parallel with a variable condenser and the circuit is shunted by a potentiometer resistance $P_1$ the movable point upon which is connected to one terminal, the anode of a rectifier $V_1$, preferably a diode rectifier as shown. The other terminal, the cathode, of the rectifier is connected to the grid of a triode $V_2$ whose cathode is connected through a biasing resistance $R_2$ to the negative terminal of a source $E_1$ of anode potential. This negative terminal is also connected to one end of the tuned circuit LC and, through a condenser K, to the grid of the triode $V_2$, there being in addition a series circuit between the said negative terminal and the said grid, this series circuit consisting of a resistance $R_1$ in series with a direct current current measuring instrument A. The anode of the triode $V_2$ is connected through a second potentiometer resistance $P_2$ to the positive terminal of the source $E_1$ and an adjustable tapping point on the said potentiometer resistance $P_2$ is connected through a bias battery $E_2$ to the grid of a gas filled relay $V_3$ whose cathode is directly connected to the anode of the triode $V_2$ and whose anode is connected to one terminal of a suitable alternating current source T, the other terminal of which is connected to the cathode of the said relay $V_3$.

The value of the anode potential on the triode $V_2$ may be, for example 42 volts, the amount of fixed grid bias in the grid circuit of the relay $V_3$ may be, for example, 3 volts negative, and the alternating current potential source may be, for example, 16 volts at 50 cycles.

To use this apparatus as a modulation meter the transmitter whose modulation is to be measured is first caused to transmit unmodulated carrier and the tuned circuit LC is tuned to this unmodulated carrier by adjusting the variable condenser until the carrier measuring instrument A indicates a maximum. The movable tapping point on the potentiometer $P_1$ is adjusted so that at this maximum indication, a reading, for example, of 10 milliamperes is then secured on the instrument A. This condition is such that the gas-filled relay $V_3$ will discharge continuously and therefore is not at the point at which it just flashes. The carrier wave from the transmitter to be measured is now modulated and the current in the tuned circuit LC, and hence the current through the measuring instrument A, is reduced because the tuned circuit LC responds only to the carrier-frequency and not to the sideband current, and in this condition the potentiometer $P_2$ is adjusted by moving the tapping point so that the relay $V_3$ just flashes. The modulation is now again stopped (i. e. unmodulated carrier is again transmitted) and the current through the measuring instrument A must be reduced by moving the potentiometer tapping point on $P_1$ until a position is reached when the relay $V_3$ begins to just flash again. The current through A in this condition is equal to the unmodulated component of carrier current through A when the modulating signals are on. In the example, 10 milliamperes of unmodulated carrier are reduced to 2 milliamperes of unmodulated carrier-component when the modulation signals are applied. Hence, the modulation is 80 percent.

An instrument, as above described, may be used not merely as a modulation meter, but also as a modulation indicator in a broadcasting system, e. g., at the transmitting room or in a studio. For such use the instrument would be so adjusted that the relay would flash as soon as any predetermined value of modulation was reached, e. g., 80%.

If desired as shown by Fig. 2, the same tuned circuit LC and associated diode $V_1$ could be employed to provide voltage for controlling a plurality of arrangements consisting each of a triode corresponding to $V_2$ and associated relay corresponding to $V_3$, each separate arrangement being adjusted independent of each other to give a flashing indication at its relay when a different percentage of modulation was reached.

An instrument in accordance with this invention can also be employed without a rectifier as a peak voltage meter, for example, for use in connection with the controlling of voltage levels in telephone lines and so forth, for which purposes the invention has the substantial advantage of providing a very simple and satisfactory instrument of substantially inertialess characteristics.

Having now particularly described and ascertained the nature of my said invention and in what manner the same is to be performed, I declare that what I claim is:

1. A radio frequency modulation indicator comprising a tuned circuit having an inductance and a variable condenser, a potentiometer having a movable arm, the end terminals of said potentiometer being connected in shunt with said tuned circuit, a rectifier having an anode and cathode, the movable arm of said potentiometer connected to the anode of said rectifier, the cathode of said rectifier being directly connected to a switch arm having a plurality of separate switch points, said switch points being connected to a plurality of electron discharge devices which may be adjusted for indications independent of each other, each electron discharge device having its cathode connected through a bias resistance to the negative point of a separate voltage supply source, said voltage supply source also connected to said tuned circuit, a condenser in series with said switch arm, said negative point of said separate voltage supply source and one of the grids of said electron discharge devices, a resistance and a direct current measuring instrument connected in series between the cathode of said rectifier and said negative point of said voltage supply, the anodes of each one of said electron discharge devices being connected from said separate switch points to one end of a second potentiometer also having a movable arm, the other end of said second potentiometer being connected to the positive point of said separate voltage supply, a gaseous discharge device having an anode grid and cathode, an auxiliary alternating current voltage connected to the anode of said relay, a bias voltage supply source connected to the grid of said relay, said bias voltage connected in series with the movable arm of said second potentiometer to adjust said bias so as to cause the relay to flash when a predetermined percentage of modulation is present in said tuned circuit.

2. A multiple modulation indicator comprising a carrier frequency tuned circuit, a potentiometer having a movable arm, the ends of said potentiometer shunted across said tuned circuit, a rectifier for rectifying the voltage of said tuned circuit, said rectifier having its anode connected to the movable arm of said potentiometer, a series circuit connected between the cathode of said rectifier and the negative side of a voltage supply source, said series circuit having a direct current measuring instrument and means for applying a voltage drop substantially proportional to the current in said rectifier, to the control electrode of a plurality of thermionic valves, all of said thermionic valves having means to receive input voltages in dependence upon the rectifier output from said rectifier which is energized from said carrier frequency tuned circuit, means connecting the output circuit of each thermionic valve to a gaseous discharge relay, means for adjusting the bias battery on one of said electrodes of each relay to give a flashing indication when a predetermined percentage of modulation is present in the modulated carrier frequency energy of the tuned circuit.

RUPERT HEDLEY PALK COLLINGS.